(12) United States Patent
Krouse (10) Patent No.: US 8,333,534 B2
(45) Date of Patent: *Dec. 18, 2012

(54) METHOD AND APPARATUS FOR IMPROVED HYDROPOWER SYSTEM

(75) Inventor: Wayne F Krouse, Houston, TX (US)

(73) Assignee: Hydro Green Energy, LLC, Westmont, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/942,095

(22) Filed: Nov. 9, 2010

(65) Prior Publication Data

US 2011/0049895 A1  Mar. 3, 2011

Related U.S. Application Data

(63) Continuation of application No. 11/983,989, filed on Nov. 13, 2007, now Pat. No. 7,837,411.

(60) Provisional application No. 60/859,789, filed on Nov. 17, 2006.

(51) Int. Cl.
*E02B 9/00* (2006.01)

(52) U.S. Cl. .............................. 405/78; 405/75; 60/398

(58) Field of Classification Search .................... 405/75, 405/78; 60/398
See application file for complete search history.

(56) References Cited

U.S. PATENT DOCUMENTS

| | | | | |
|---|---|---|---|---|
| 1,813,107 A | * | 7/1931 | Allner | 290/4 D |
| 4,073,146 A | | 2/1978 | Atencio | |
| 4,078,388 A | | 3/1978 | Atencio | |
| 4,117,676 A | | 10/1978 | Atencio | |
| 4,159,188 A | | 6/1979 | Atencio | |
| 4,165,467 A | | 8/1979 | Atencio | |
| 4,170,428 A | | 10/1979 | Atencio | |
| 4,201,059 A | * | 5/1980 | Feder | 60/639 |
| 4,261,171 A | | 4/1981 | Atencio | |
| 4,279,539 A | | 7/1981 | Atencio | |
| 4,468,153 A | | 8/1984 | Atencio | |

* cited by examiner

*Primary Examiner* — Sean Andrish (57) ABSTRACT

Methods and apparatus for improved power generation through movement of water retrofitting existing hydroelectric dams with draft tube inserts and tailrace walls to increase water velocity for production of power using hydrokinetic turbines installed in the tailrace. By initial design or by draft tube inserts and tailrace walls, increased and streamlined water flow leads to higher efficiencies of the hydrokinetic turbine, thus more efficiently converting available kinetic energy of the water into usable energy.

14 Claims, 7 Drawing Sheets

Fig. 1

PRIOR ART

PRIOR ART

PRIOR ART

METHOD AND APPARATUS FOR IMPROVED HYDROPOWER SYSTEM

CROSS REFERENCE TO RELATED APPLICATIONS

This application is a continuation of application Ser. No. 11/983,989 filed on Nov. 13, 2007, issued as U.S. Pat. No. 7,837,411 which is based on provisional application Ser. No. 60/859,789, filed on Nov. 17, 2006, which is incorporated as if fully set forth herein.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of energy and more specifically to methods and apparatus for an improved hydropower system.

There are a variety of prior art systems for extracting power from water based systems such as dams, rivers and ocean flows. Several patents disclose a variety of after market retrofits for extracting hydropower from river flow by inserting additional equipment at the base of the dam to take advantage of the head potential present behind the dam. For example, U.S. Pat. Nos. 4,073,146, 4,078,388, 4,117,676, 4,159,188, 4,165,467, 4,170,428, 4,261,171, 4,279,539, and 4,468,153 show a retrofit system for extracting energy out of the head potential of a dam. None of these patents shows the innovative combination of the present invention and its use for increased extraction of kinetic flow energy in a downstream system and innovative method of increasing flow velocity for kinetic hydropower.

One of the current problems facing hydrokinetic power producers when locating hydrokinetic turbines downstream of existing dams is that the design of the draft tube at an existing dam (the draft tube conducts water from the outlet of the turbine to the body of water downstream of the existing dam) is specifically designed to dissipate kinetic energy. That is to say, the draft tube is a diffuser. The diffuser sometimes takes the shape of a frustoconical or an elliptically shaped conical fusta due to underwater bathymetry. The end result of the draft tube diffuser is that the kinetic energy of the water is lowered, meaning the water velocity is slowed. An additional problem that hydrokinetic power producers face at dams is that many tailrace designs dump water from the outlet of the draft tube into an open body of water, such as a lake, reservoir, pool, or river to additionally dissipate the kinetic energy of the water in the tailrace exiting the draft tube.

BRIEF SUMMARY OF THE INVENTION

The primary advantage of the invention is to provide improved hydrokinetic power system.

Another advantage of the invention is to provide a retrofit for existing dams to increase velocity of flow to a kinetic power system.

Another advantage of the invention is a method to retrofit existing hydropower dam system outflow draft tubes to lessen the loss of flow velocity to improve efficiency and increase power in downstream hydrokinetic turbines.

Another advantage of the invention is to provide wall system to channel flow to increase kinetic energy downstream of a dam for a hydrokinetic power system.

A further advantage of the invention is to provide a kinetic power system that utilizes increase flow dynamics in situ.

In accordance with a preferred embodiment of the invention, there is disclosed a system for improved power generation having a dam storing water as potential energy, one or more hydroelectric turbines positioned in the dam to receive the kinetic movement of water, one or more draft tubes to conduct water from the outlet of the hydroelectric turbines to a body of water downstream of the dam tailrace, one or more reciprocal draft tube inserts placed in the draft tube to reduce the water diffusing characteristics of the draft tubes and increase water velocity at the draft tube outlets, and one or more hydrokinetic turbines installed in the dam tailrace to produce energy from the water flow exiting the draft tube outlets.

In accordance with another preferred embodiment of the invention, there is disclosed a system for improved power generation having a dam storing water as potential energy, one or more hydroelectric turbines positioned in the dam to receive the kinetic movement of water, one or more draft tubes to conduct water from the outlet of the hydroelectric turbines to a body of water downstream of the dam tailrace, one or more walls fixably attached to the dam tailrace bottom and draft tube outlet side of the dam perpendicular to the dam to channel the dam outlet water, and one or more hydrokinetic turbines installed in the dam tailrace receiving the water flow channeled by the walls in the dam tailrace.

In accordance with a preferred embodiment of the invention, there is disclosed a method for improved power generation having the steps of storing water as potential energy behind a dam, converting the potential energy to electricity by moving stored water through one or more hydroelectric turbines positioned in the dam to receive the water, conducting water through one or more draft tubes to from the outlet of said hydroelectric turbines to the dam tailrace, reducing the water diffusing characteristics of the draft tubes and increasing water velocity at the draft tube outlets through one or more draft tube inserts, and positioning one or more hydrokinetic turbines in the dam tailrace to produce energy from the water flow exiting the draft tube outlets.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
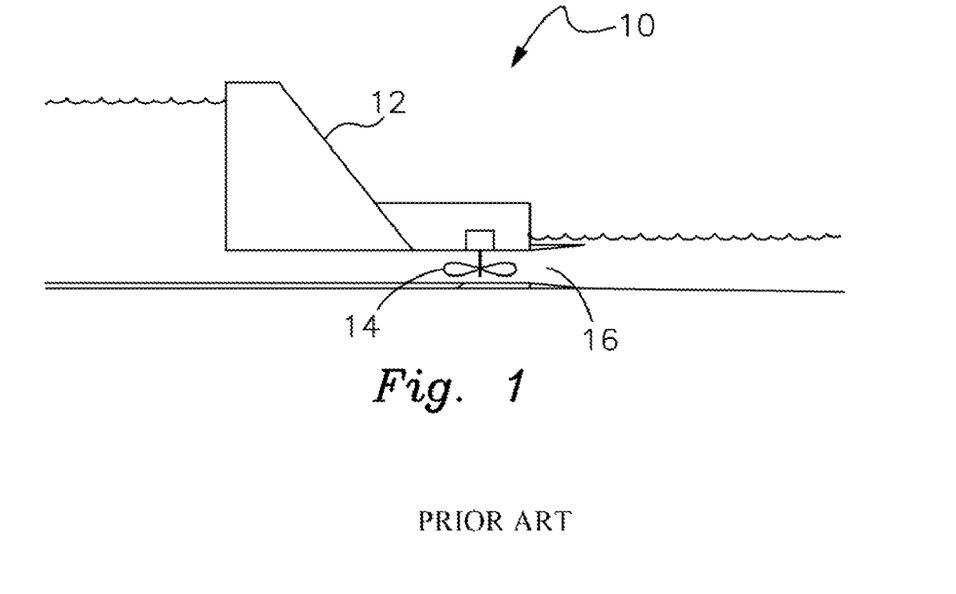
FIG. 1 shows a schematic diagram of a power generating station on a dam in a conventional configuration using head potential to generate power through a turbine and outflow through a draft tube.

A system to retrofit existing hydropower dams so that the kinetic energy in the tailrace (the tailrace is the body of water directly at the outlet of the draft tube) can be increased for higher hydrokinetic energy production at a downstream hydrokinetic energy generating power station. FIG. 1 shows a conventional power system 10 where head power from the upstream water blocked by a dam 12 is used to drive turbine 14 to generate power. Outflow of turbine 14 is through draft tube 16 which dissipates the flow of water from the turbine to reduce turbulence and other negative effects.

As previously mentioned, one of the current problems facing hydrokinetic power producers when locating hydrokinetic turbines downstream of existing dams is that the design of the draft tube at an existing dam (the draft tube conducts water from the outlet of the turbine to the body of water downstream of the existing dam) is specifically designed to dissipate kinetic energy. The end result of is that the kinetic energy of the water is lowered, meaning the water velocity is slowed, thus reducing potential capture of energy.

A hydrokinetic turbine, one which operates solely on the water velocity, and not the pressure head of impounded water, from a theoretical standpoint, require the highest possible water velocity and the largest possible turbine diameter in order to generate the greatest amount of power possible.

By installing a retrofit to the draft tube of the existing dam or designing the draft tube for optimal flow can result in a significant increase in the streamlined or turbulent flow velocity at the outlet of the draft tube, resulting in a much higher velocity at the downstream hydrokinetic turbine thereby increasing the power output. This can be accomplished in a number of ways by adding a retrofit draft tube insert or initially designing a draft tube for a new dam such that the diffusing rate that is lower but still of a diffusing design (the ratio of area's is still positive) or have a constant diameter draft tube or slightly decrease the draft tube diameter to compensate for minor frictional losses in the draft tube due to the materials of construction of the draft tube.

In a preferred embodiment, the flow may be streamlined as it lends itself to higher efficiencies of the hydrokinetic turbine, thus more efficiently converting available kinetic energy of the water into usable energy (shaft work).

Figure 2:
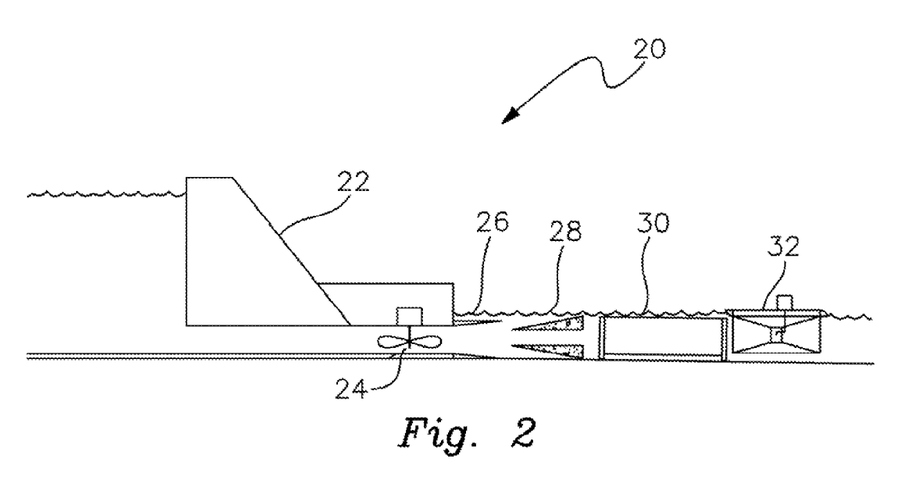
FIG. 2 shows a retrofit insert and draft tube exit wall in combination with a hydro kinetic turbine according to a preferred embodiment of the present invention.

FIG. 2 shows a combination of an insert to the draft tube and exit wall according to a preferred embodiment of the invention. Power system 20 has one or more conventional turbines 24 placed in dam 22 for generation of power from the head potential of the dam. A draft tube 26 is fitted with a reciprocal tube insert 28 for changing the flow characteristics of the tube. Preferably, but not required in all situations, is draft tube exit wall 30 placed in line with the inserted tube 28 to further channel the flow of water to the hydrokinetic turbine 32.

Reciprocal tube insert 28 can be designed in several ways including as a permanent retrofit or a temporary retrofit that could be removed or replaced. Further, the draft tube insert may be made from many materials of construction including, but not limited to, reinforced concrete; metals of various types; wood; and reinforced or non-reinforced synthetic material (for example, plastics), to name a few.

Figure 3:
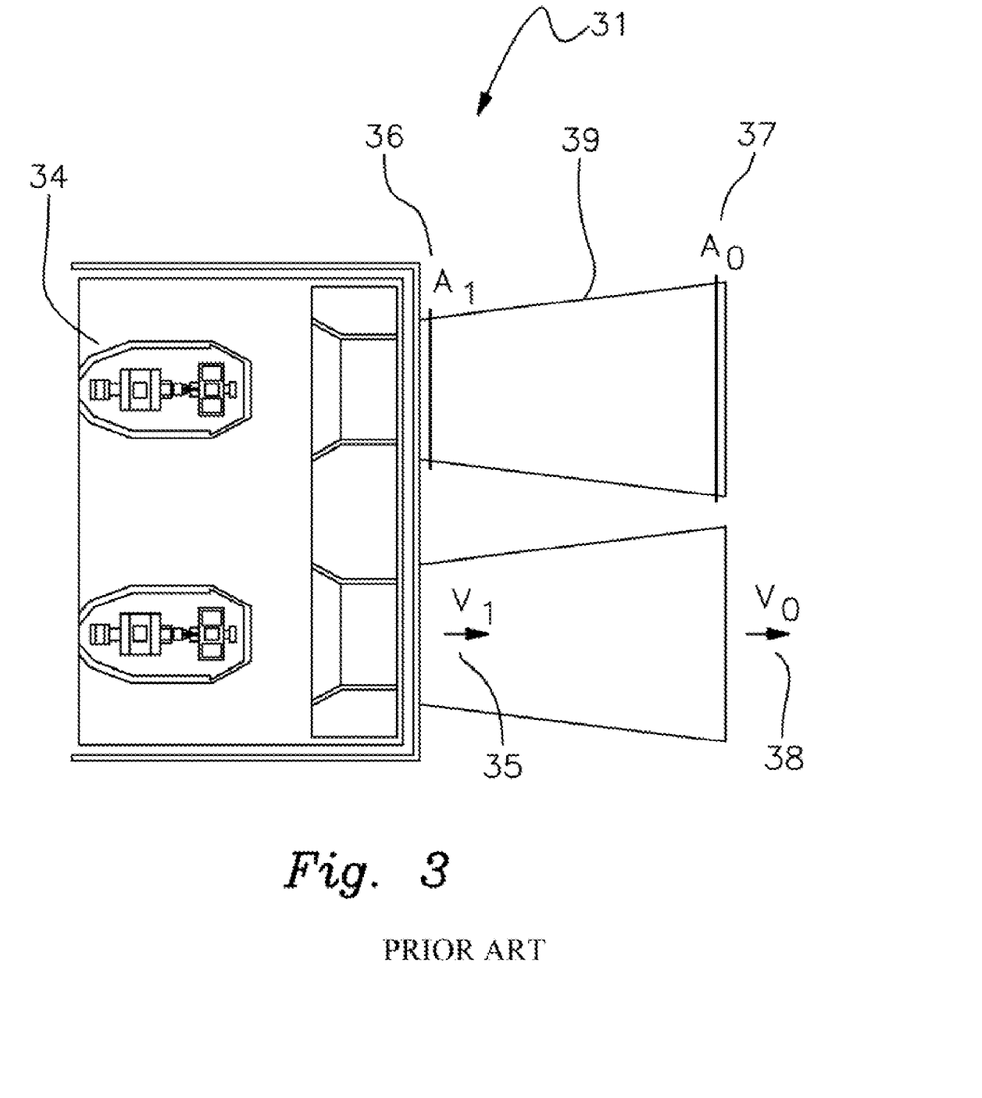
FIG. 3 shows a plan view of a conventional draft tube and turbine power assembly with attendant decrease in velocity of water exiting the turbine.

FIG. 3 shows the flow characteristics of a convention draft tube system. Turbine 34 generates power from water flow that exits through the draft tube 39. The flow rate remains constant where $A_i$ 36 is the draft tube cross sectional area closest to the turbine, and $A_o$ 37 is the cross sectional area farthest from the turbine. Notably, velocity $v_i$ 35 is substantially higher than $v_O$ 38 demonstrating that the draft tube decreases velocity of water exiting turbine 34.

Figure 4:
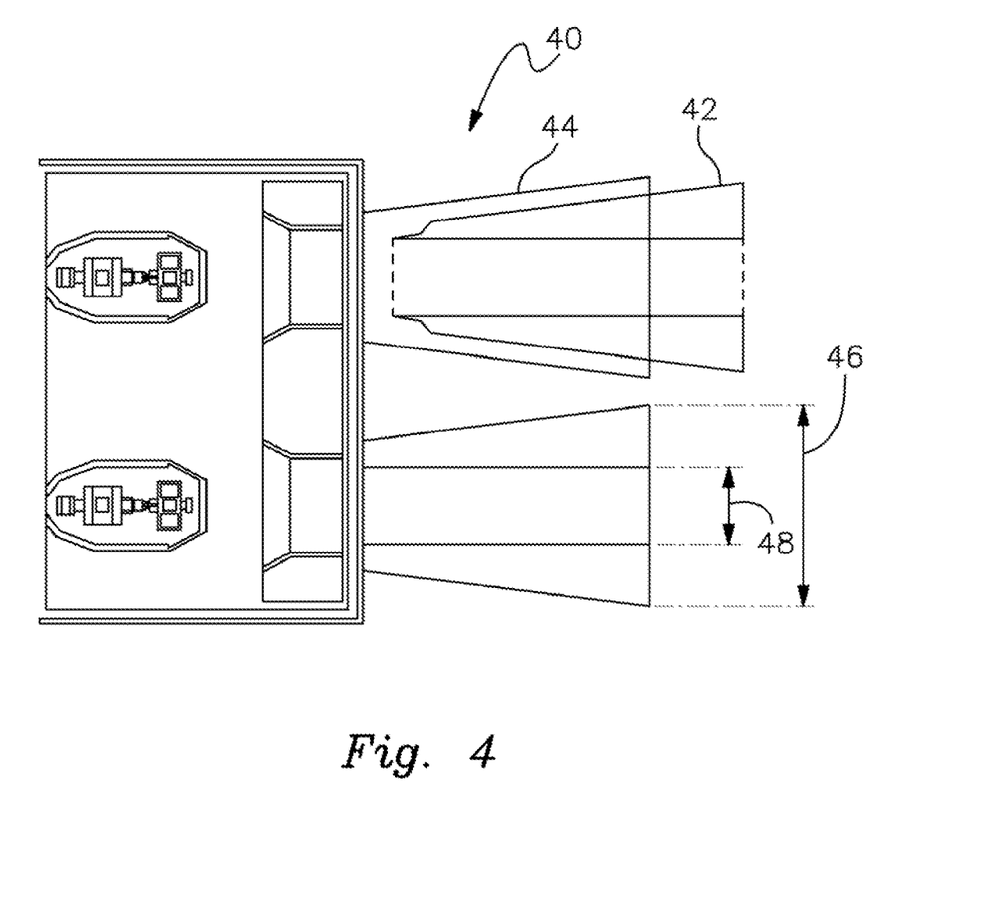
FIG. 4 shows a draft tube insert according to a preferred embodiment of the present invention and effective reduced diameter of draft tube for increased velocity

FIG. 4 shows a power system 40 having conventional turbines with draft tube 44 retrofitted with tube insert 42 as shown before full insertion, thereby reducing the old diameter 46 of the draft tube to new diameter 48 which increases the velocity of the exiting water.

Tube insert 42, in a preferred embodiment, is designed to matably insert into draft tube 44 as shown in FIG. 4 with similar outside dimensions to match the inside dimensions of draft tube 44.

Figure 5:
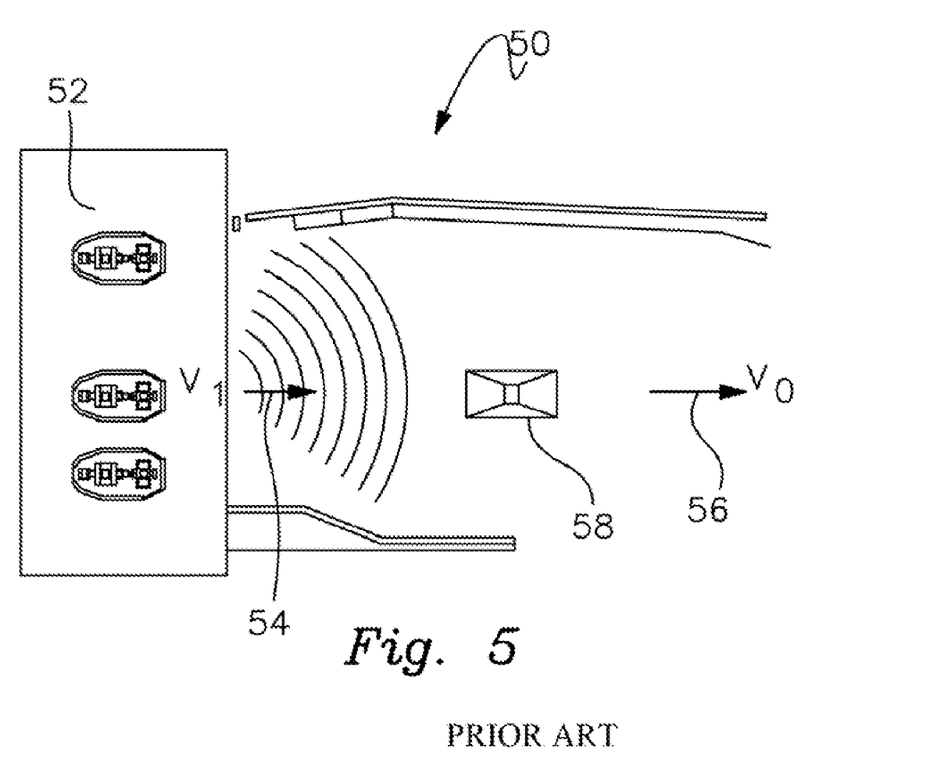
FIG. 5 shows a conventional power configuration without tailrace walls and attendant dissipated power potential to kinetic turbine downstream.

FIG. 5 shows a power system 50 for converting river flow through turbines to electrical energy. Turbines 52 are placed in a conventional manner whereby flow velocity $v_1$ 54 is higher than flow velocity $v_0$ 56. Without the additional of tailrace walls, the kinetic energy at the draft tube dissipates radially outward proportional to the following equation: $KE=\frac{1}{2}\,mv^2$.

Since velocity is directly proportional to the inverse of the square of the distance from the draft tube, flow velocity $v_1$ 54 is significantly higher than flow velocity $v_0$ 56. Therefore, power potential for hydrokinetic turbine 58 is reduced and inefficiently low. To increase the flow characteristics for the hydrokinetic turbine, tailrace walls may be preferably placed at the output of the draft tubes.

By inserting a wall in between each draft tube outlet, the kinetic energy of the water is forced into a more constant cross sectional channel which also has the effect of preventing or reducing the rate of the dissipation of kinetic energy from the water resulting in higher water velocities (higher kinetic energy) further downstream. Another enhancement to the insertion of walls in between the draft tube outlets is to install a floor below the draft tube outlets that extends downstream with the walls that have been installed creating a channel. By keeping the cross sectional area of the channel for the flowing water relatively constant, additional increases in the kinetic energy of the water can be obtained which increases the quantity of power generated by the hydrokinetic system.

Figure 6:
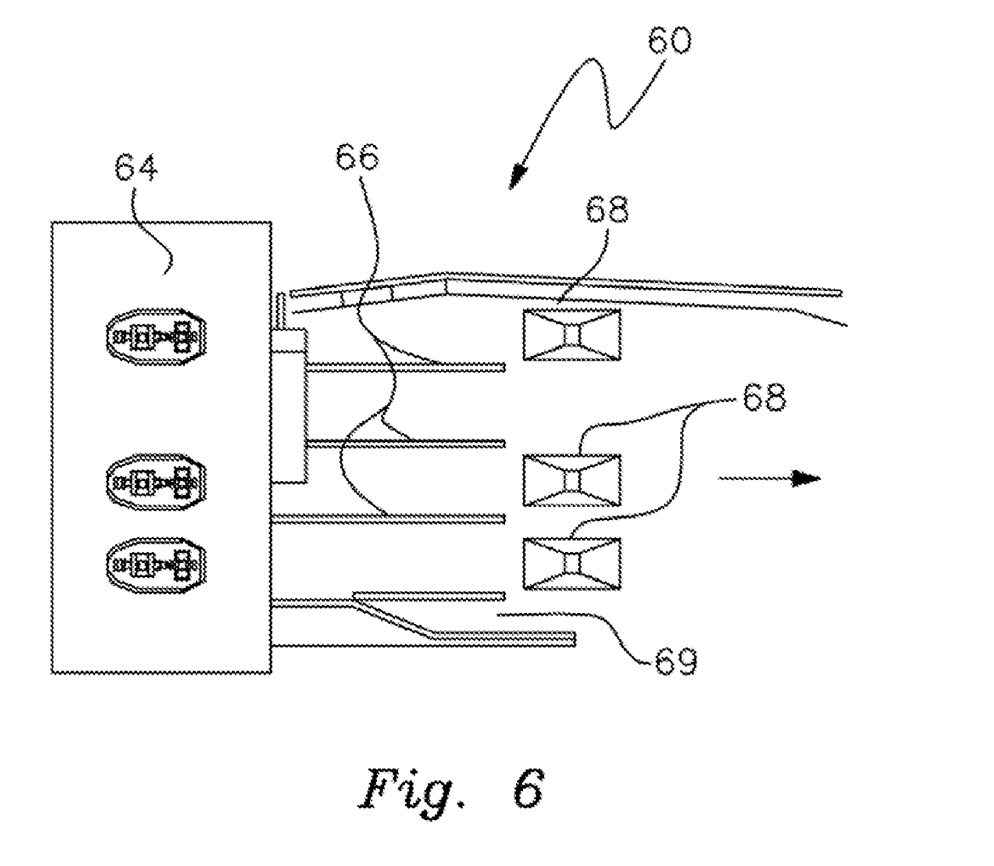
FIG. 6 shows tailrace walls for increased power potential to downstream hydro kinetic power turbines in multiple wall configurations and shapes.

FIG. 6 shows a power system 60 with conventional turbine room 64 for generating hydroelectric power from a river. As water flows through the turbines out the draft tube outlets, it is channeled by tailrace walls 66 that direct the water and increase velocity of flow to high power potential hydrokinetic turbines 68. By doing so, the tailrace walls greatly increase the velocity of downstream flow to the hydrokinetic turbines thereby generating significantly higher amounts of power.

Figure 7:
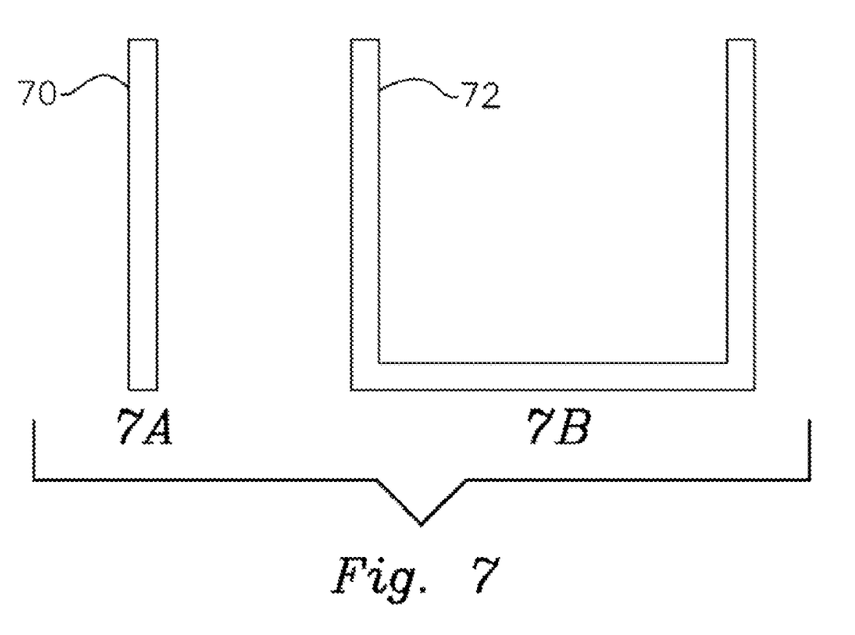
FIGS. 7A and 7B show a cross sectional view of a representative tailrace vertical wall and tailrace box wall respectively.

FIG. 7 shows an embodiment of the tailrace and channel walls and or floors such as vertical wall 70 and box wall 72. The combination of walls and floors of the channel can be in many shapes including, but not limited to, vertical parallel walls only; walls and floor that create a "U" shape; walls and floor that create a "U" shape, but converge the further downstream from the draft tube to keep the kinetic energy high; walls that form a "V"; walls that are fully submerged; and walls that are partially submerged.

The optimal system for the highest possible hydrokinetic power generation system downstream of a dam for a given dam design may be a combination of both a modified draft tube as shown in FIG. 2 and tailrace and channel walls and or floors as shown in FIGS. 6 and 7.

While the invention has been described in connection with several preferred embodiments, it is not intended to limit the scope of the invention to the particular form set forth, but on the contrary, it is intended to cover such alternatives, modifications, and equivalents as may be included within the spirit and scope of the invention as defined by the issued claims.

What is claimed is:

1. A system for improved power generation through movement of water comprising:
   a dam storing water as potential energy;
   one or more hydroelectric turbines positioned in said dam to receive the movement of the water;
   one or more draft tubes to conduct the water from an outlet of said one or more hydroelectric turbines to a body of water downstream of a dam tailrace;
   one or more mating removable draft tube inserts placed in each of said draft tubes having a central generally cylindrical bore and outlet to reduce water diffusing characteristics of said draft tubes and increase water velocity at said draft tube outlets; and
   one or more hydrokinetic turbines positioned adjacent the outlet side of said draft tube inserts to produce energy from the movement of said water exiting said draft tube insert outlets.

2. The system for improved power generation through movement of water as claimed in claim 1 further comprising one or more vertical walls positioned downstream of said draft tube insert outlet of said dam perpendicular to said dam.

3. The system for improved power generation through movement of water as claimed in claim 2 wherein said one or more vertical walls are "U" shaped.

4. The system for improved power generation through movement of water as claimed in claim 1 wherein said one or more draft tube inserts are manufactured from reinforced concrete.

5. The system for improved power generation through movement of water as claimed in claim 1 wherein said draft tube insert is manufactured from synthetic material.

6. The system for improved power generation through movement of water as claimed in claim 1 wherein said one or more draft tube inserts are manufactured from metal.

7. A method for improved power generation through movement of water comprising:
   storing water behind a dam as potential energy having a downstream tailrace with a bottom portion;
   conducting the water from an outlet of said dam through one or more draft tubes to a body of water downstream of the downstream tailrace having a bottom floor;
   inserting one or more walls positioned in said body of water downstream of said one or more draft tubes of said dam perpendicular and adjacent to said draft tube; and
   positioning one or more hydroelectric turbines at the downstream end of said one or more walls to receive movement of water.

8. The method for improved power generation through movement of water as claimed in claim 7 further comprising one or more floors attached to the dam tailrace bottom floor and downstream of said one or more draft tubes perpendicular to said dam to channel said dam outlet water.

9. The method for improved power generation through movement of water as claimed in claim 7 wherein said one or more walls and said tailrace floor form a "U" shape.

10. The method for improved power generation through movement of water as claimed in claim 7 wherein said one or more walls form a "U" shape close to the dam outlet and converge downstream to increase kinetic energy prior to said water flow entering said one or more hydroelectric turbines.

11. The method for improved power generation through movement of water as claimed in claim 7 wherein at least one or more of said walls extend perpendicularly from said dam adjacent an outermost draft tube of said dam.

12. The method for improved power generation through movement of water as claimed in claim 7 wherein said one or more walls are fully submerged in the dam tailrace.

13. The method for improved power generation through movement of water as claimed in claim 7 wherein said one or more walls are partially submerged in the dam tailrace.

14. The method for improved power generation through movement of water as claimed in claim 7 further comprising one or more reciprocal draft tube inserts placed in said one or more draft tube to reduce the water diffusing characteristics of said one or more draft tubes and increase water velocity at said draft tube outlets.

\* \* \* \* \*